US010259093B2

(12) United States Patent
Chang et al.

(10) Patent No.: US 10,259,093 B2
(45) Date of Patent: Apr. 16, 2019

(54) SMART GRINDING MACHINE THAT DETECTS GRINDING PROCESS AUTOMATICALLY

(71) Applicant: Falcon Machine Tools Co., Ltd., Taichung (TW)

(72) Inventors: Po-Ming Chang, Taichung (TW); Chin-Peng Li, Taichung (TW); Chin-Wei Chuang, Taichung (TW)

(73) Assignee: Falcon Machine Tools Co., Ltd., Taichung (TW)

(*) Notice: Subject to any disclaimer, the term of this patent is extended or adjusted under 35 U.S.C. 154(b) by 105 days.

(21) Appl. No.: 15/633,844

(22) Filed: Jun. 27, 2017

(65) Prior Publication Data

US 2018/0369980 A1    Dec. 27, 2018

(51) Int. Cl.
| | | |
|---|---|---|
| *B24B 7/02* | (2006.01) | |
| *B24B 47/02* | (2006.01) | |
| *B24B 49/16* | (2006.01) | |
| *B24B 49/12* | (2006.01) | |
| *B24B 55/00* | (2006.01) | |
| *B24B 41/04* | (2006.01) | |
| *G05B 19/18* | (2006.01) | |

(52) U.S. Cl.
CPC ............. *B24B 7/02* (2013.01); *B24B 41/042* (2013.01); *B24B 47/02* (2013.01); *B24B 49/12* (2013.01); *B24B 49/16* (2013.01); *B24B 55/00* (2013.01); *G05B 19/182* (2013.01); *G05B 2219/34012* (2013.01); *G05B 2219/45161* (2013.01)

(58) Field of Classification Search
CPC ........... B24B 7/02; B24B 47/02; B24B 47/04; B24B 47/08; B24B 49/006; B24B 49/10; B24B 49/12; B24B 49/16; B24B 49/18; B24B 51/00; B24B 55/00; G05B 19/182; G05B 2219/45161
See application file for complete search history.

(56) References Cited

U.S. PATENT DOCUMENTS

| | | | | |
|---|---|---|---|---|
| 2,390,978 A | * | 12/1945 | Woodbury | .............. B24B 47/04 192/139 |
| 2,859,564 A | * | 11/1958 | Farmer | ..................... B24B 7/04 451/14 |
| 3,803,768 A | * | 4/1974 | Littwin | .................. B23Q 15/00 451/215 |

(Continued)

*Primary Examiner* — Timothy V Eley
(74) *Attorney, Agent, or Firm* — Alan D. Kamrath; Kamrath IP Lawfirm, P.A.

(57) ABSTRACT

A grinding machine includes a plane grinding mechanism carrying a workpiece, an electrically controlled device mounted on the plane grinding mechanism, a grinder unit rotatably mounted on the plane grinding mechanism to grind the workpiece, and a smart working control system mounted on the plane grinding mechanism and electrically coupled to the electrically controlled device. The smart working control system includes a smart coder and a smart driver. When a load and a cutting force produced between the grinder unit and the workpiece reach preset parameters during the grinding process, the smart driver executes the working sequence or parameter setting program edited by the smart coder, to shorten a movement distance of the workbench of the plane grinding mechanism along the X-axis (leftward and rightward), and to produce an optimum lapping path.

10 Claims, 12 Drawing Sheets

(56) References Cited

U.S. PATENT DOCUMENTS

| | | | |
|---|---|---|---|
| 7,056,189 B2* | 6/2006 | Yui | B23Q 17/12 |
| | | | 451/11 |
| 8,403,728 B2* | 3/2013 | Chen | B23Q 39/024 |
| | | | 451/150 |
| 8,784,155 B2* | 7/2014 | Guo | B24B 41/02 |
| | | | 451/150 |
| 9,272,385 B2* | 3/2016 | Guo | B24B 25/00 |
| 2002/0146962 A1* | 10/2002 | Huang | B24B 35/005 |
| | | | 451/9 |

* cited by examiner

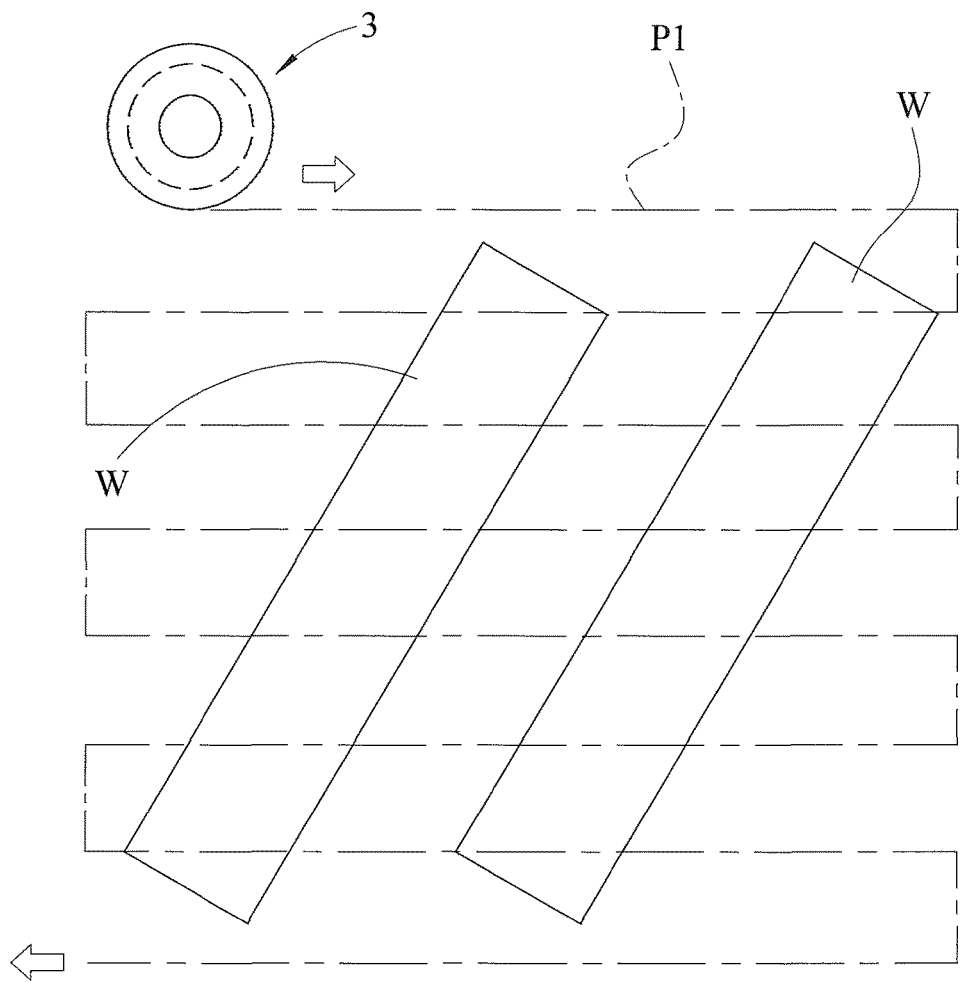
F I G . 9

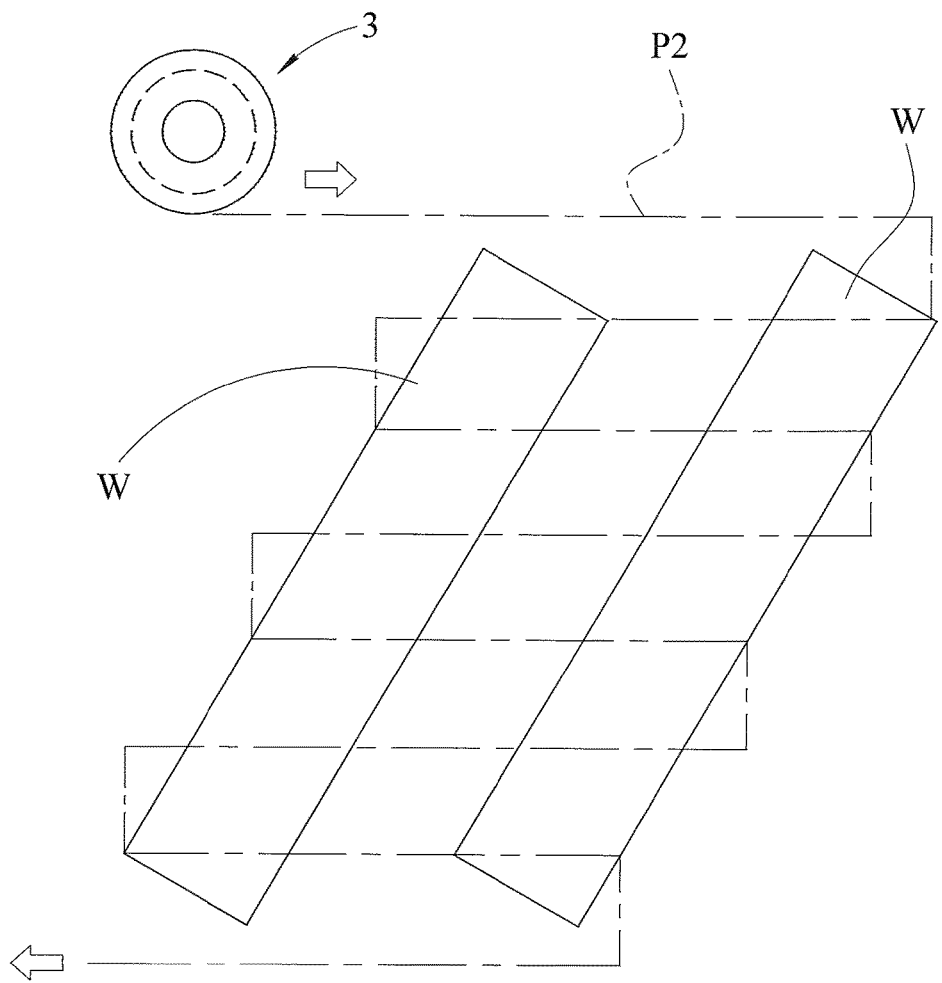
F I G . 10

SMART GRINDING MACHINE THAT DETECTS GRINDING PROCESS AUTOMATICALLY

BACKGROUND OF THE INVENTION

1. Field of the Invention

The present invention relates to a tool machine and, more particularly, to a grinding machine used for a precision working process.

2. Description of the Related Art

A conventional grinding machine 7 in accordance with the prior art shown in FIGS. 11 and 12 comprises a base 71, a saddle 711 movably mounted on the base 71, an upright 712 mounted on the base 71, a holder 713 movably mounted on the upright 712, a grinding wheel 714 rotatably mounted on the holder 713, and a workbench 72 mounted on the saddle 711 for carrying a workpiece "W". The workbench 72 is moved along the X-axis (leftward and rightward), the holder 713 is moved along the Y-axis (upward and downward), and the saddle 711 is moved along the Z-axis (forward and backward). In operation, the grinding wheel 714 is moved with the holder 713 and is moved relative to the workbench 72 along the Y-axis (upward and downward), the workbench 72 is moved with the saddle 711 and is moved relative to the upright 712 along the Z-axis (forward and backward), and the workbench 72 is moved relative to the upright 712 along the X-axis (leftward and rightward), so that the grinding wheel 714 is rotated at a high speed to grind the workpiece "W" on the workbench 72, and to produce a standard lapping path "P1" as shown in FIG. 12. The lapping path means a grinding path of the grinding wheel 714 relative to the workpiece "W". However, the workpiece "W" is arranged on the workbench 72 with different angles during the grinding process, or the workpiece "W" may have an irregular shape, so that when the workbench 72 is moved reciprocally along the X-axis (leftward and rightward), the movement distance of the workbench 72 along the standard lapping path "P1" is lengthened, thereby increasing the grinding time, and reducing the productivity.

BRIEF SUMMARY OF THE INVENTION

The primary objective of the present invention is to provide a smart grinding machine that detects a grinding process automatically.

In accordance with the present invention, there is provided a grinding machine comprising a plane grinding mechanism, an electrically controlled device, a grinder unit and a smart working control system. The plane grinding mechanism includes a base, a workbench movably mounted on the base for carrying a workpiece, and a mounting structure mounted on the base. The mounting structure includes a mount, a grinder support mounted on the mount, and a motor mounted on the mount and driving the grinder support. The electrically controlled device is mounted on the plane grinding mechanism and includes a controller for controlling operation of the plane grinding mechanism. The grinder unit is mounted on and rotated with the grinder support of the plane grinding mechanism to grind the workpiece. The smart working control system is mounted on the plane grinding mechanism and electrically coupled to the electrically controlled device. The smart working control system includes a smart coder and a smart driver. The smart coder is electrically coupled to the motor of the mounting structure and rotated with the grinder unit synchronously. The smart coder edits a working sequence or a parameter setting program of the smart working control system. The smart driver is arranged in the electrically controlled device and electrically coupled to the controller of the electrically controlled device and the smart coder to receive and execute commands transmitted by the controller of the electrically controlled device and the smart coder. The smart driver of the smart working control system receives the commands transmitted by the controller of the electrically controlled device and the smart coder, and starts operation of the plane grinding mechanism, so that the grinder unit is moved to grind the workpiece, and the workbench of the plane grinding mechanism is moved along an X-axis (leftward and rightward) to produce a standard lapping path for grinding of the grinder unit. When a load and a cutting force produced between the grinder unit and the workpiece reach preset parameters during the grinding process, the smart driver of the smart working control system executes the working sequence or parameter setting program edited by the smart coder, to shorten a movement distance of the workbench of the plane grinding mechanism along the X-axis (leftward and rightward), and to produce an optimum lapping path.

According to the primary advantage of the present invention, the smart working control system automatically detects the whole profile of the workpiece during the grinding process, to shorten the movement distance of the workbench of the plane grinding mechanism along the X-axis (leftward and rightward), and to produce the optimum lapping path, thereby shortening the grinding movement distance, reducing the grinding time, and thereby enhancing the working efficiency.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 9 is a top view showing the standard lapping path of the grinding machine.

FIG. 10 is a top view showing the optimum lapping path of the grinding machine.

DETAILED DESCRIPTION OF THE INVENTION

Figure 1:
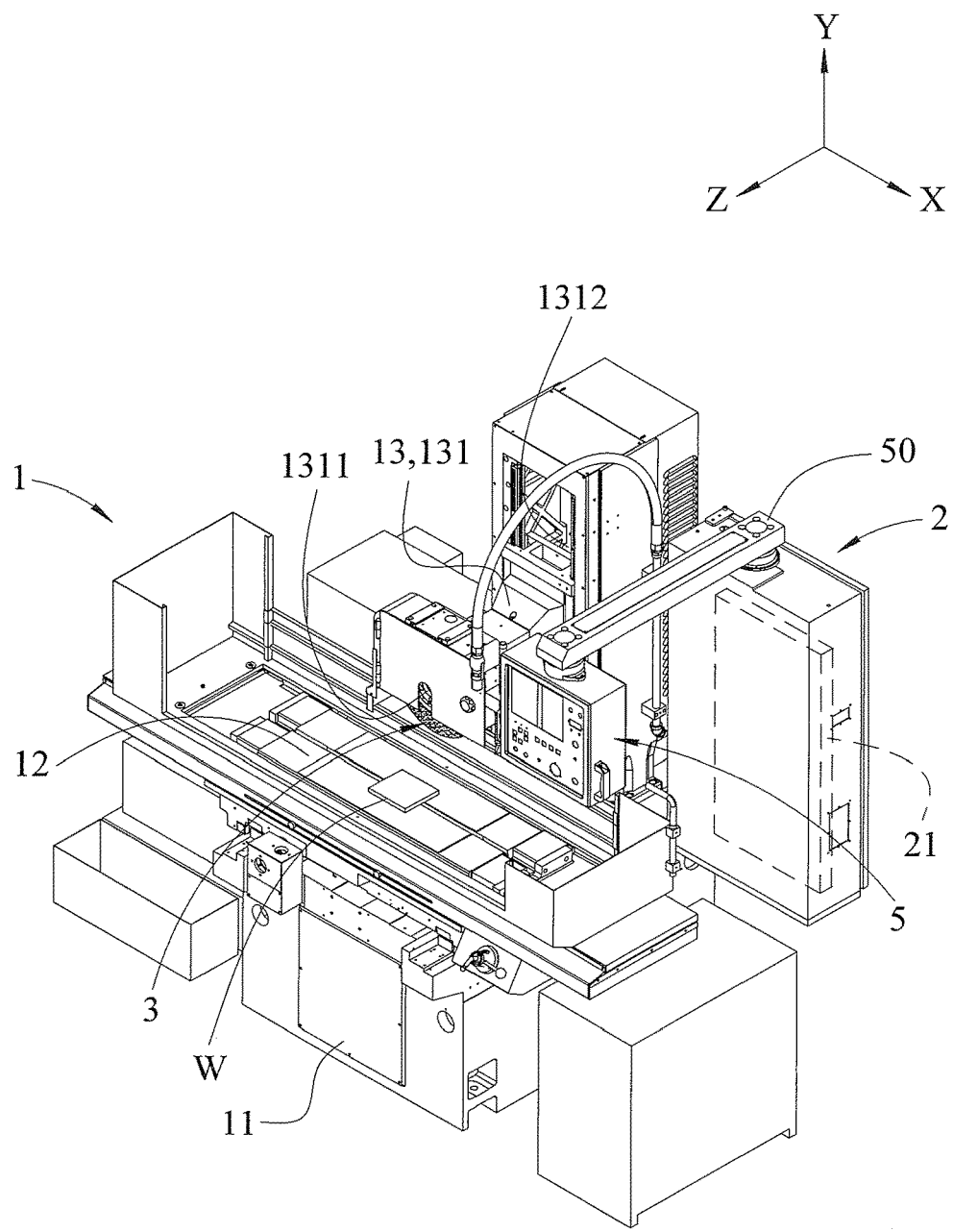
FIG. 1 is a perspective view of a grinding machine in accordance with the preferred embodiment of the present invention.
Figure 2:
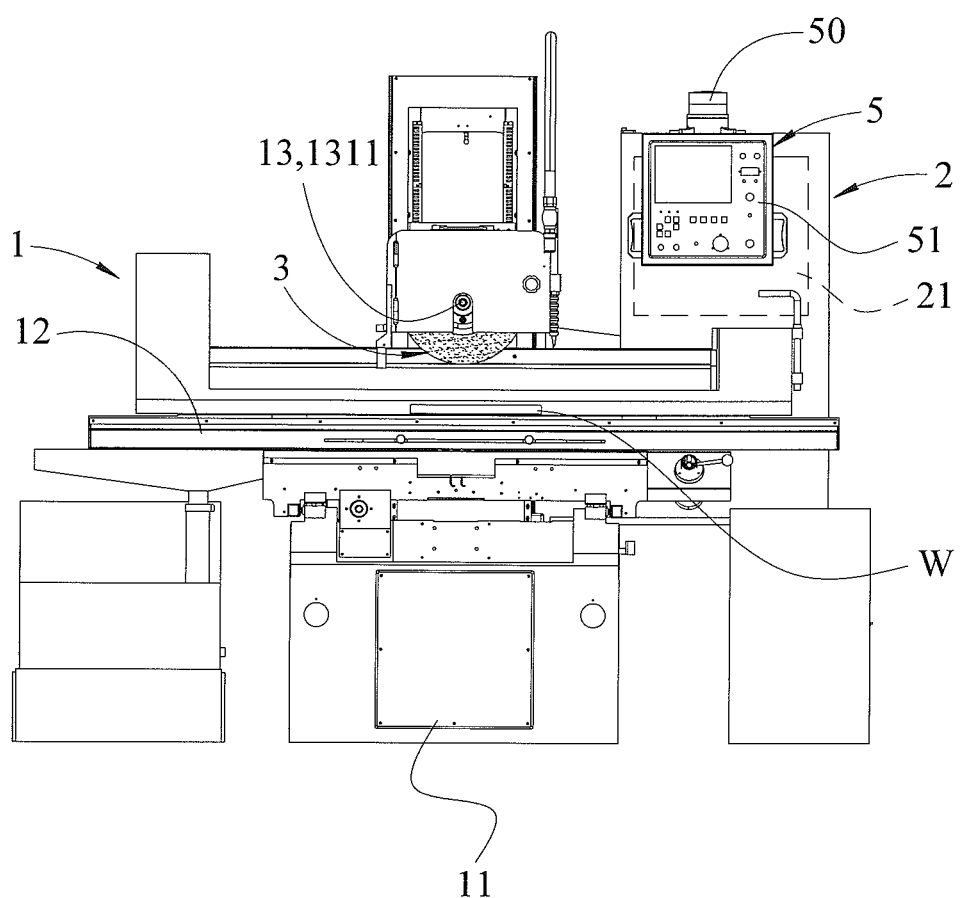
FIG. 2 is a front view of the grinding machine as shown in FIG. 1.
Figure 3:
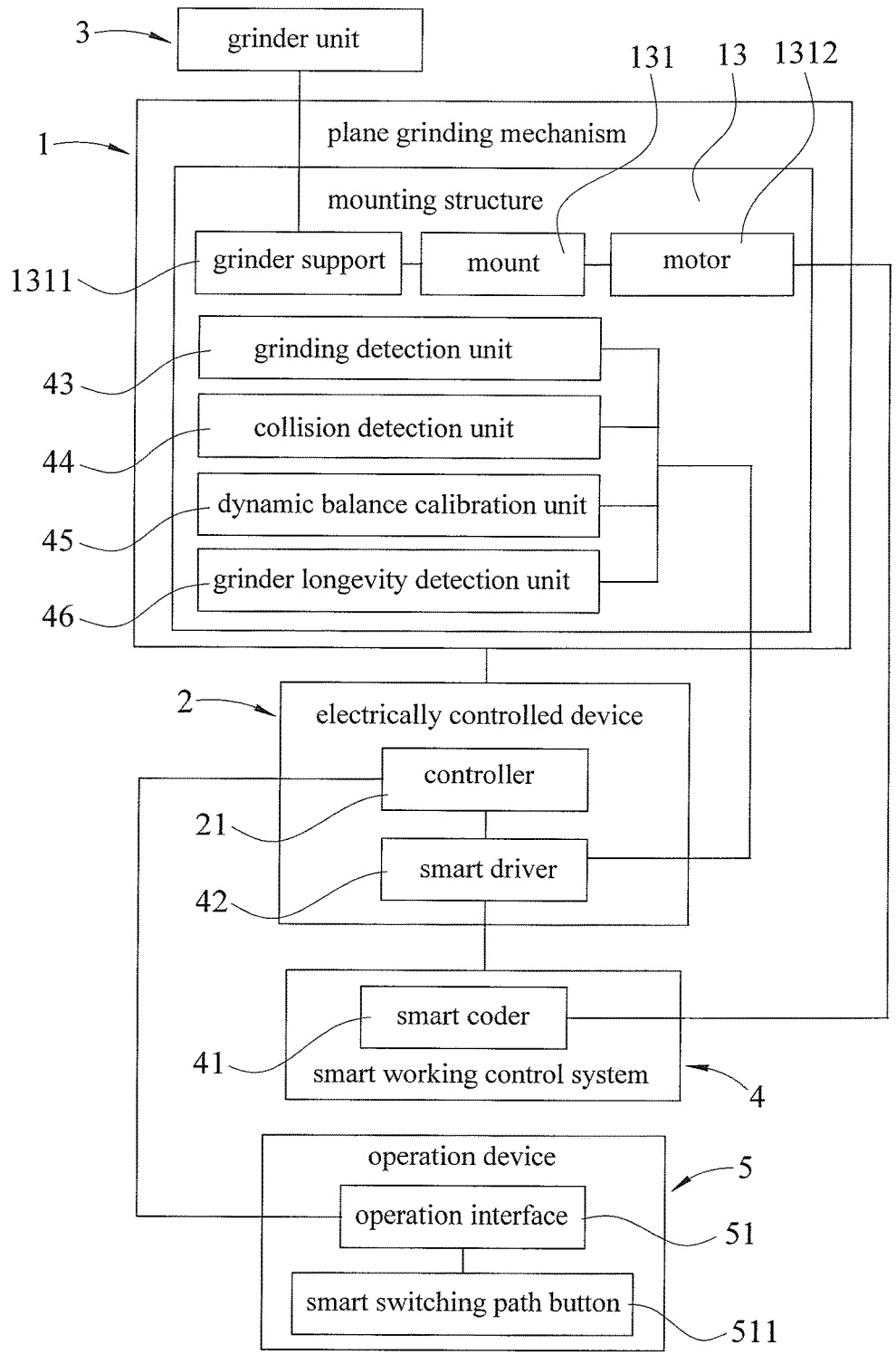
FIG. 3 is a block diagram of the grinding machine in accordance with the preferred embodiment of the present invention.
Figure 4:
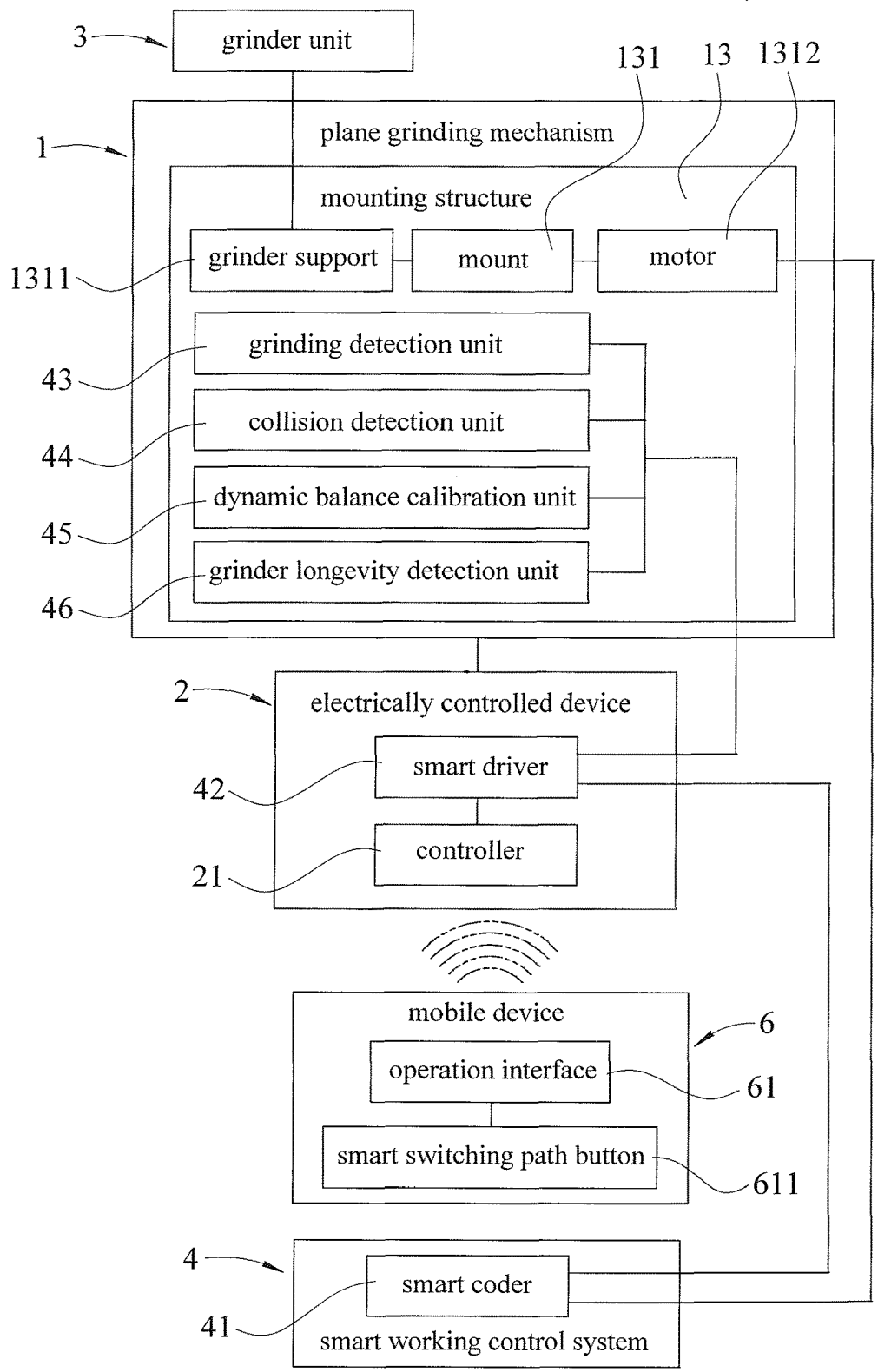
FIG. 4 is a block diagram of the grinding machine in accordance with another preferred embodiment of the present invention.

Referring to the drawings and initially to FIGS. 1-6, a grinding machine in accordance with the preferred embodiment of the present invention comprises a plane grinding mechanism 1, an electrically controlled device 2, a grinder unit 3 and a smart working control system 4.

The plane grinding mechanism 1 includes a base 11, a workbench 12 movably mounted on the base 11 for carrying a workpiece "W", and a mounting structure 13 mounted on the base 11. The workbench 12 is moved along an X-axis (leftward and rightward). The mounting structure 13 includes a mount 131, a grinder support 1311 mounted on the mount 131, and a motor 1312 mounted on the mount 131 and driving the grinder support 1311 to rotate through 360 degrees. Preferably, the plane grinding mechanism 1 is an NC plane grinding bed or an automatic plane grinding bed, such as a saddle movable plane grinding bed, a moving column plane grinding bed, a two-shaft plane grinding bed, or a three-shaft plane grinding bed. When the workbench 12 is moved reciprocally along the X-axis (leftward and rightward), the plane grinding mechanism 1 simultaneously drives the workbench 12 to move reciprocally along the Z-axis (forward and backward).

The electrically controlled device 2 is mounted on the plane grinding mechanism 1 and includes a controller 21 for controlling operation of the plane grinding mechanism 1.

The grinder unit 3 is mounted on and rotated with the grinder support 1311 of the plane grinding mechanism 1 to grind the workpiece "W".

The smart working control system 4 is mounted on the plane grinding mechanism 1 and electrically coupled to the electrically controlled device 2. The smart working control system 4 includes a smart coder 41 and a smart driver 42.

The smart coder 41 is electrically coupled to the motor 1312 of the mounting structure 13 and rotated with the grinder unit 3 synchronously. The smart coder 41 edits the working sequence or parameter setting program of the smart working control system 4.

The smart driver 42 is arranged in the electrically controlled device 2 and electrically coupled to the controller 21 of the electrically controlled device 2 and the smart coder 41 to receive and execute commands transmitted by the controller 21 of the electrically controlled device 2 and the smart coder 41.

The smart working control system 4 further includes a grinding detection unit 43 arranged in the mounting structure 13 of the plane grinding mechanism 1 and electrically coupled to the smart driver 42. The smart driver 42 receives and transmits the parameter setting commands of the smart coder 41 to the grinding detection unit 43 which detects the load parameter of the grinder unit 3 during grinding. When an abnormal condition happens, the grinding detection unit 43 notifies or warns the user to detect or repair the grinder unit 3.

The smart working control system 4 further includes a collision detection unit 44 arranged in the mounting structure 13 of the plane grinding mechanism 1 and electrically coupled to the smart driver 42. The smart driver 42 receives and transmits the parameter setting commands of the smart coder 41 to the collision detection unit 44 which constantly detects the load parameter and presets the upper limit of the load parameter, to prevent the grinder unit 3 from hitting the workpiece "W" unexpectedly.

The smart working control system 4 further includes a dynamic balance calibration unit 45 arranged in the mounting structure 13 of the plane grinding mechanism 1 and electrically coupled to the smart driver 42. The dynamic balance calibration unit 45 integrates the parameter setting information of the controller 21 of the electrically controlled device 2 and the smart coder 41, and constantly performs a vibration measurement and a dynamic balance calibration on the mounting structure 13 of the plane grinding mechanism 1 and the grinder unit 3, so as to reduce the vibration of the grinder unit 3, to eliminate the surface vibration lines of the workpiece "W", and to enhance the grinding quality. Preferably, the dynamic balance calibration unit 45 is an accelerometer with a frequency of more than 3 KHz.

The smart working control system 4 further includes a grinder longevity detection unit 46 arranged in the mounting structure 13 of the plane grinding mechanism 1 and electrically coupled to the smart driver 42. The grinder longevity detection unit 46 integrates the parameter setting information of the smart coder 41 and the vibration measurement information of the dynamic balance calibration unit 45, to precisely detect the wear type and the dressing time of the grinder unit 3, and to exactly predict the lifetime of the grinder unit 3, so as to enhance the efficiency of production. The wear type of the grinder unit 3 includes shedding wear, abrasive grain wear, crushed abrasive grain, grind scrap, adhesion, blockage or the like.

Figure 6:
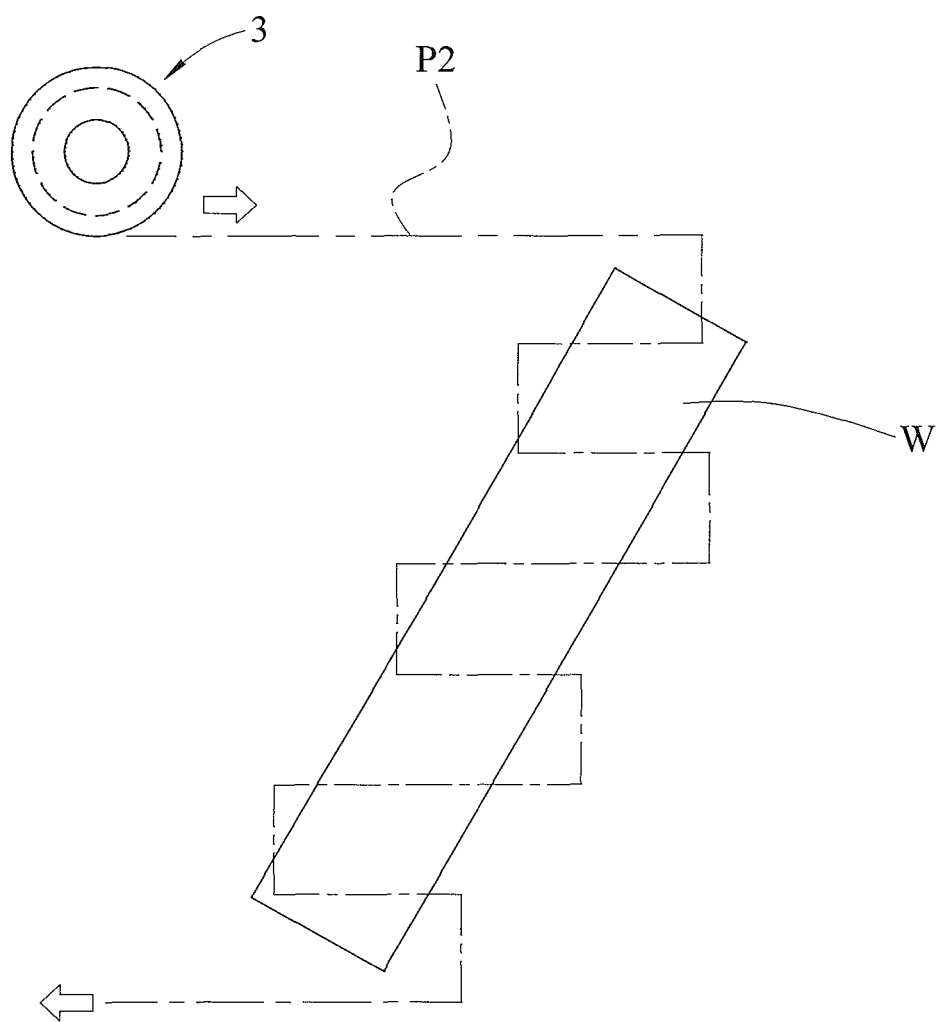
FIG. 6 is a top view showing the optimum lapping path of the grinding machine.
Figure 7:
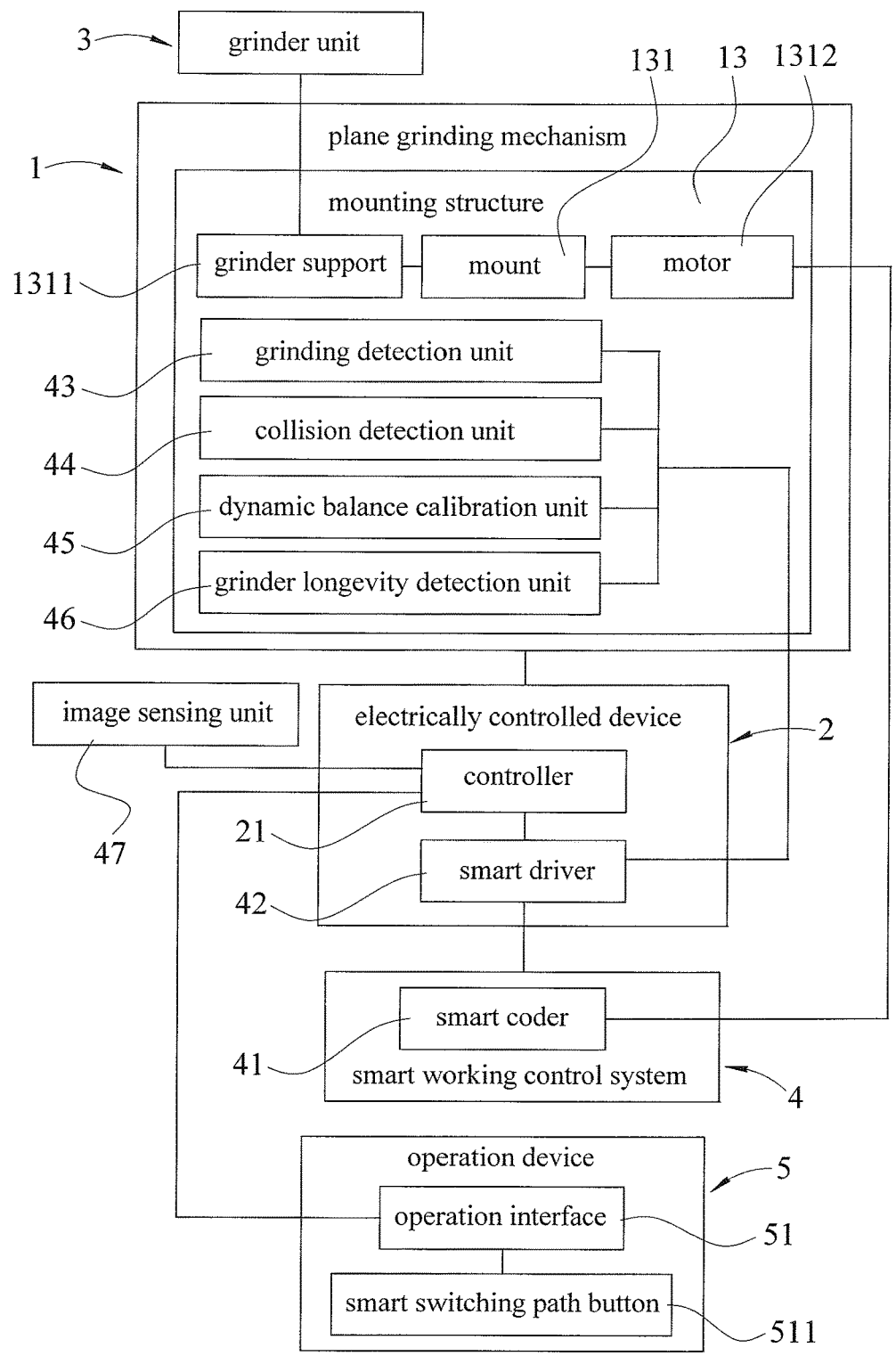
FIG. 7 is a block diagram of the grinding machine in accordance with another preferred embodiment of the present invention.
Figure 8:
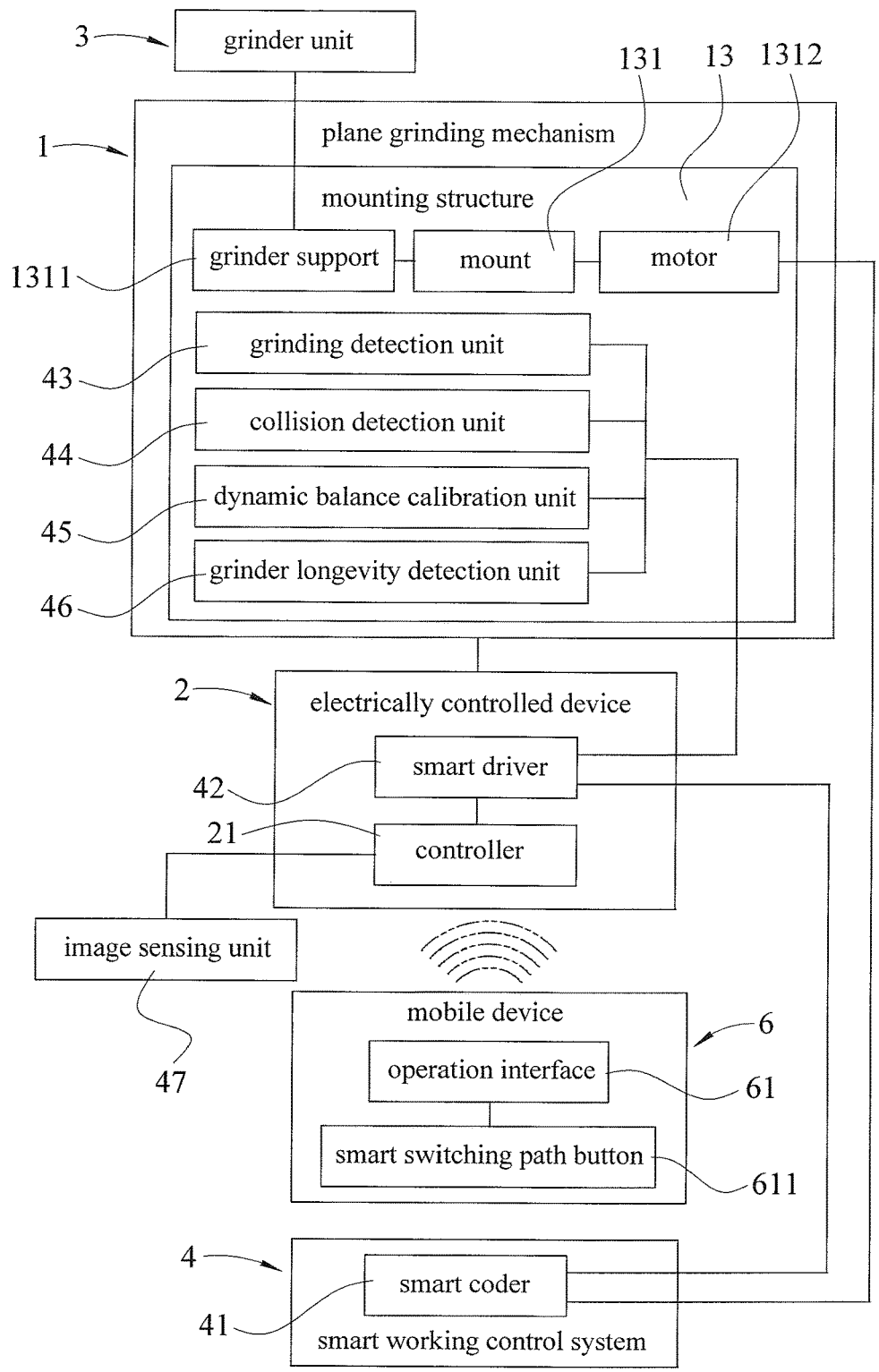
FIG. 8 is a block diagram of the grinding machine in accordance with another preferred embodiment of the present invention.
Figure 11:
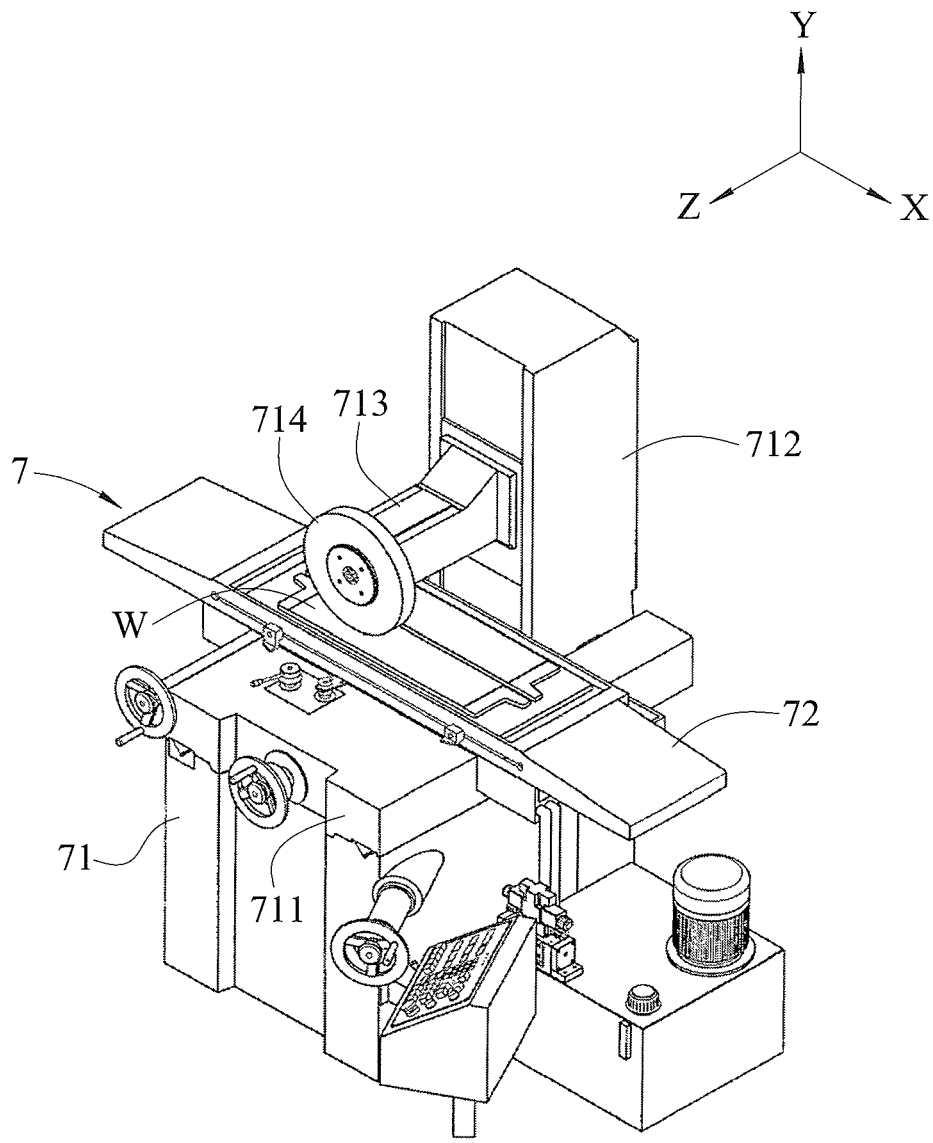
FIG. 11 is a perspective view of a conventional grinding machine in accordance with the prior art.
Figure 12:
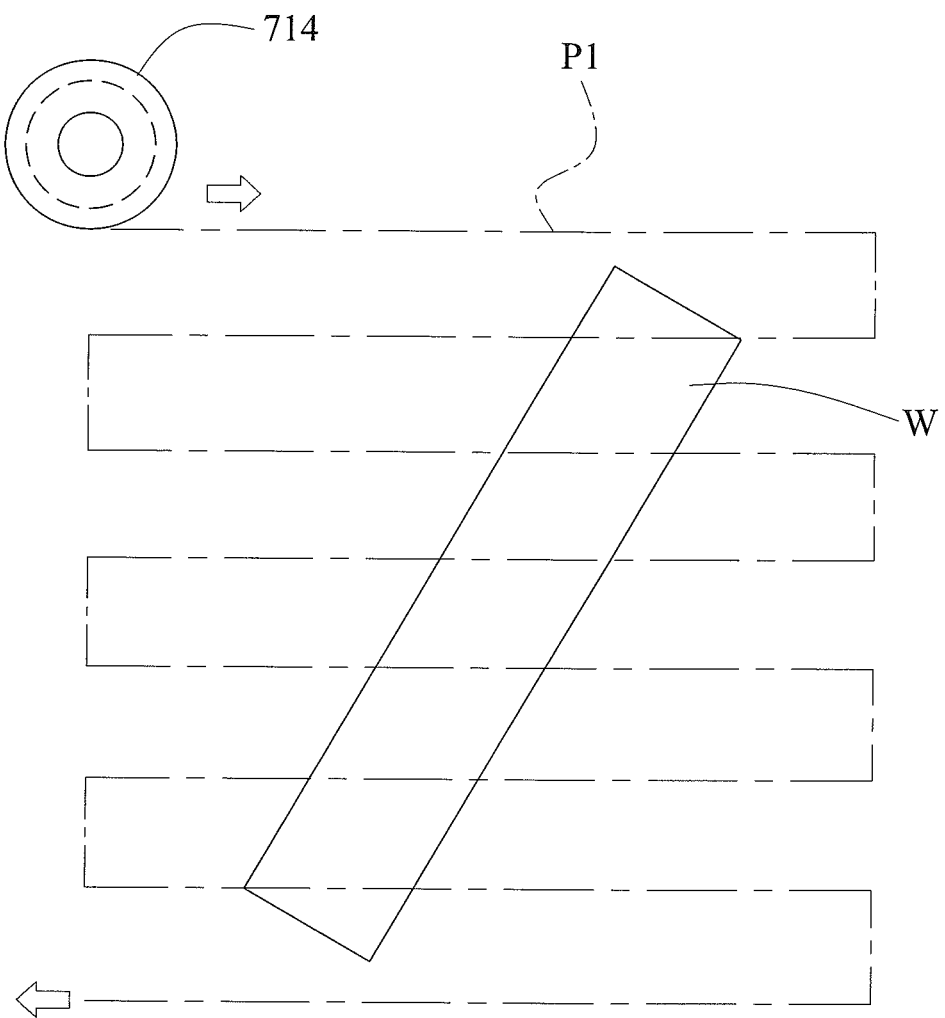
FIG. 12 is a top view showing the standard lapping path of the conventional grinding machine.

The grinding machine further comprises an operation device 5 (see FIG. 3) secured to the electrically controlled device 2 by a connecting lever 50 and including an operation interface 51 electrically coupled to the controller 21 of the electrically controlled device 2. The operation interface 51 of the operation device 5 is operated by the user to preset the movement of the workbench 12 of the plane grinding mechanism 1, the rotation speed of the mounting structure 13 of the plane grinding mechanism 1, and the feed quantity of the grinder unit 3 relative to the workpiece "W". The operation interface 51 of the operation device 5 indicates a start command of a smart switching path button 511, that is switched by the user, to execute the working procedure of an optimum lapping path "P2" as shown in FIG. 6, and indicates the parameters of the load and the cutting force between the grinder unit 3 and the workpiece "W" during the grinding process.

The grinding machine further comprises a mobile device 6 (see FIG. 4) connected with the controller 21 of the electrically controlled device 2 in a wireless manner, such as by an external cloud server. The mobile device 6 includes an operation interface 61 operated by the user to preset the movement of the workbench 12 of the plane grinding mechanism 1, the rotation speed of the mounting structure 13 of the plane grinding mechanism 1, and the feed quantity of the grinder unit 3 relative to the workpiece "W". The operation interface 61 of the mobile device 6 indicates a start command of a smart switching path button 611, that is switched by the user, to execute the working procedure of the optimum lapping path "P2", and indicates the parameters of the load and the cutting force produced between the grinder unit 3 and the workpiece "W" during the grinding process. In the preferred embodiment of the present invention, the mobile device 6 includes a smart cell phone, a tablet computer, a personal computer or a PDA. The operation interface 61 of the mobile device 6 includes an APP application program, such as the Microsoft Windows, the Android and the iOS.

In practice, a method for grinding the workpiece "W" comprises a first step S1, a second step S2, a third step S3 and a fourth step S4.

The first step S1 includes mounting the workpiece "W" on the workbench 12 of the plane grinding mechanism 1.

The second step S2 includes manipulating the operation interface 51 of the operation device 5 (or the operation interface 61 of the mobile device 6) to start operation of the plane grinding mechanism 1 which performs the grinding procedures. For example, the operation interface 51 of the operation device 5 (or the operation interface 61 of the mobile device 6) presets the movement of the workbench 12 of the plane grinding mechanism 1, the rotation speed of the mounting structure 13 of the plane grinding mechanism 1, and the feed quantity of the grinder unit 3 relative to the workpiece "W".

Figure 5:
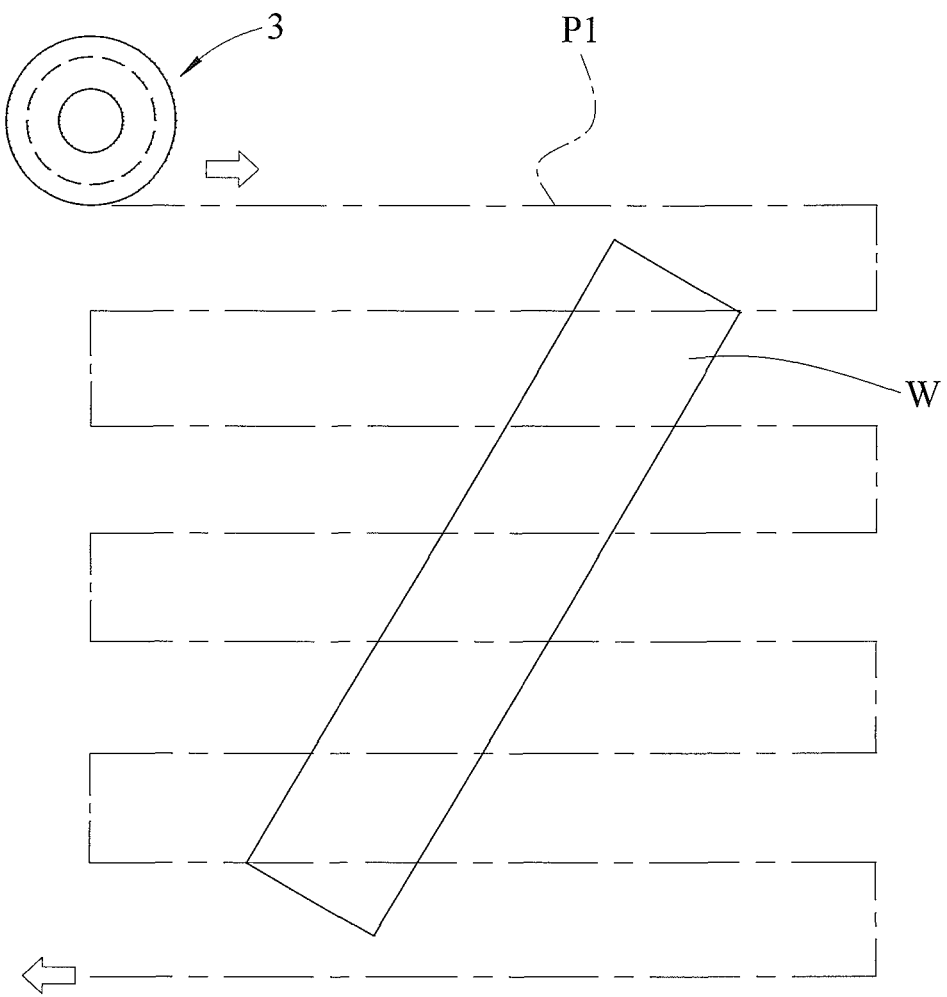
FIG. 5 is a top view showing the standard lapping path of the grinding machine.

The third step S3 includes driving the grinder unit 3 to grind the workpiece "W", and moving the workbench 12 of the plane grinding mechanism 1 along the X-axis (leftward and rightward) to produce a standard lapping path "P1" as shown in FIG. 5. The lapping path means a grinding path of the grinder unit 3 relative to the workpiece "W".

The fourth step S4 includes opening the command of the smart switching path button 511 of the operation interface 51 of the operation device 5 (or the smart switching path button 611 of the operation interface 61 of the mobile device 6). When the load and the cutting force produced between the grinder unit 3 and the workpiece "W" reach the preset parameters during the grinding process, the smart driver 42 of the smart working control system 4 receives the commands transmitted by the controller 21 of the electrically controlled device 2 and the smart coder 41, and automatically executes the working sequence or parameter setting program edited by the smart coder 41, to shorten the movement distance of the workbench 12 of the plane grinding mechanism 1 along the X-axis (leftward and rightward), and to produce the optimum lapping path "P2" as shown in FIG. 6, so as to facilitate the grinder unit 3 grinding the workpiece "W", thereby shortening the grinding movement distance, and thereby enhancing the working efficiency.

It is appreciated that, when the user presses the smart switching path button 511 of the operation interface 51 (or the smart switching path button 611 of the operation interface 61), the lapping path of the grinder unit 3 relative to the workpiece "W" is switched between the standard lapping path "P1" and the optimum lapping path "P2" to facilitate the user selecting the standard lapping path "P1" or the optimum lapping path "P2".

In the fourth step S4, the smart driver 42 receives and transmits the parameter setting commands of the smart coder 41 to the grinding detection unit 43 which detects the load parameter of the grinder unit 3 during grinding. When the abnormal condition happens, the grinding detection unit 43 notifies or warns the user to detect or repair the grinder unit 3.

In the fourth step S4, the smart driver 42 receives and transmits the parameter setting commands of the smart coder 41 to the collision detection unit 44 which constantly detects the load parameter and presets the upper limit of the load parameter, to prevent the grinder unit 3 from hitting the workpiece "W" unexpectedly.

In the fourth step S4, the dynamic balance calibration unit 45 integrates the parameter setting information of the controller 21 of the electrically controlled device 2 and the smart coder 41, and constantly performs a vibration measurement and a dynamic balance calibration on the mounting structure 13 of the plane grinding mechanism 1 and the grinder unit 3, so as to reduce the vibration of the grinder unit 3, to eliminate the surface vibration lines of the workpiece "W", and to enhance the grinding quality.

In the fourth step S4, the grinder longevity detection unit 46 integrates the parameter setting information of the smart coder 41 and the vibration measurement information of the dynamic balance calibration unit 45, to precisely detect the wear type and the dressing time of the grinder unit 3, and to exactly predict the lifetime of the grinder unit 3, so as to enhance the efficiency of production.

Accordingly, the smart working control system 4 automatically detects the whole profile of the workpiece "W" during the grinding process, to shorten the movement distance of the workbench 12 of the plane grinding mechanism 1 along the X-axis (leftward and rightward), and to produce the optimum lapping path "P2", thereby shortening the grinding movement distance, reducing the grinding time, and thereby enhancing the working efficiency.

Referring to FIGS. 7-10, a grinding machine in accordance with another preferred embodiment of the present invention is used to work a plurality of workpieces "W" simultaneously. The workbench 12 of the plane grinding mechanism 1 carries the workpieces "W". The grinding machine further comprises an image sensing unit 47 mounted on the plane grinding mechanism 1 and electrically coupled to the controller 21 of the electrically controlled device 2. Preferably, the image sensing unit 47 is a CCD (charge coupled device). The image sensing unit 47 of the smart working control system 4 photographs during the grinding process of the grinder unit 3 and the workpieces "W", and gets a parameter information which is transmitted to the controller 21 which performs an image operation processing and transmission, while the smart driver 42 receives the commands transmitted by the controller 21 and the smart coder 41, so as to produce the optimum lapping path "P2" as shown in FIG. 10.

In practice, a method for grinding the workpieces "W" comprises a first step S1, a second step S2, a third step S3 and a fourth step S4.

The first step S1 includes mounting the workpieces "W" on the workbench 12 of the plane grinding mechanism 1.

The second step S2 includes manipulating the operation interface 51 of the operation device 5 (or the operation interface 61 of the mobile device 6) to start operation of the plane grinding mechanism 1 which performs the grinding procedures. For example, the operation interface 51 of the operation device 5 (or the operation interface 61 of the mobile device 6) presets the movement of the workbench 12 of the plane grinding mechanism 1, the rotation speed of the mounting structure 13 of the plane grinding mechanism 1, and the feed quantity of the grinder unit 3 relative to the workpieces "W".

The third step S3 includes driving the grinder unit 3 to grind the workpieces "W", and moving the workbench 12 of the plane grinding mechanism 1 along the X-axis (leftward and rightward) to produce a standard lapping path "P1" as shown in FIG. 9.

The fourth step S4 includes opening the command of the smart switching path button 511 of the operation interface 51 of the operation device 5 (or the smart switching path button 611 of the operation interface 61 of the mobile device 6). At the same time, the image sensing unit 47 of the smart working control system 4 photographs during the grinding process of the grinder unit 3 and the workpieces "W", and gets a parameter information which is transmitted to the controller 21 which performs an image operation processing. When the load and the cutting force produced between the grinder unit 3 and the workpieces "W" reach the preset parameters during the grinding process, the smart driver 42 of the smart working control system 4 receives the commands transmitted by the controller 21 of the electrically controlled device 2 and the smart coder 41, and automatically executes the working sequence or parameter setting program edited by the smart coder 41, to shorten the movement distance of the workbench 12 of the plane grinding mechanism 1 along the X-axis (leftward and rightward), and to produce the optimum lapping path "P2" as shown in FIG. 10, so as to facilitate the grinder unit 3 grinding the workpieces "W", thereby shortening the grinding movement distance, and thereby enhancing the working efficiency.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A grinding machine comprising:
a plane grinding mechanism, an electrically controlled device, a grinder unit and a smart working control system;
wherein:
the plane grinding mechanism includes a base, a workbench movably mounted on the base for carrying a workpiece, and a mounting structure mounted on the base;
the mounting structure includes a mount, a grinder support mounted on the mount, and a motor mounted on the mount;
the electrically controlled device is mounted on the plane grinding mechanism and includes a controller for controlling operation of the plane grinding mechanism;
the grinder unit is mounted on and rotated with the grinder support of the plane grinding mechanism to grind the workpiece;
the smart working control system is mounted on the plane grinding mechanism and electrically coupled to the electrically controlled device;
the smart working control system includes a smart coder and a smart driver;
the smart coder is electrically coupled to the motor of the mounting structure and rotated with the grinder unit synchronously;
the smart coder edits a working sequence or a parameter setting program of the smart working control system;
the smart driver is arranged in the electrically controlled device and electrically coupled to the controller of the electrically controlled device and the smart coder to receive and execute commands transmitted by the controller of the electrically controlled device and the smart coder;
the smart driver of the smart working control system receives the commands transmitted by the controller of the electrically controlled device and the smart coder, and starts operation of the plane grinding mechanism, so that the grinder unit is moved to grind the workpiece, and the workbench of the plane grinding mechanism is moved along an X-axis to produce a standard lapping path; and
when a load and a cutting force produced between the grinder unit and the workpiece reach preset parameters during a grinding process, the smart driver of the smart working control system executes the working sequence or parameter setting program edited by the smart coder, to shorten a movement distance of the workbench of the plane grinding mechanism along the X-axis, and to produce an optimum lapping path.

2. The grinding machine of claim 1, wherein:
the smart working control system further includes a grinding detection unit arranged in the mounting structure of the plane grinding mechanism and electrically coupled to the smart driver;
the smart driver receives and transmits the parameter setting commands of the smart coder to the grinding detection unit which detects a load parameter of the grinder unit during grinding; and
when an abnormal condition happens, the grinding detection unit notifies or warns a user to detect or repair the grinder unit.

3. The grinding machine of claim 1, wherein:
the smart working control system further includes a collision detection unit arranged in the mounting structure of the plane grinding mechanism and electrically coupled to the smart driver; and
the smart driver receives and transmits the parameter setting commands of the smart coder to the collision detection unit which constantly detects a load parameter and presets an upper limit of the load parameter, to prevent the grinder unit from hitting the workpiece unexpectedly.

4. The grinding machine of claim 1, wherein:
the smart working control system further includes a dynamic balance calibration unit arranged in the mounting structure of the plane grinding mechanism and electrically coupled to the smart driver; and
the dynamic balance calibration unit integrates a parameter setting information of the controller of the electrically controlled device and the smart coder, and constantly performs a vibration measurement and a dynamic balance calibration on the mounting structure of the plane grinding mechanism and the grinder unit.

5. The grinding machine of claim 4, wherein:
the smart working control system further includes a grinder longevity detection unit arranged in the mounting structure of the plane grinding mechanism and electrically coupled to the smart driver; and
the grinder longevity detection unit integrates the parameter setting information of the smart coder and the vibration measurement information of the dynamic balance calibration unit, to precisely detect a wear type and a dressing time of the grinder unit.

6. The grinding machine of claim 4, wherein the dynamic balance calibration unit is an accelerometer with a frequency of more than 3 KHz.

7. The grinding machine of claim 1, wherein:
the grinding machine further comprises an operation device secured to the electrically controlled device by a connecting lever and including an operation interface electrically coupled to the controller of the electrically controlled device;
the operation interface of the operation device is operated by a user to preset the movement of the workbench of the plane grinding mechanism, a rotation speed of the mounting structure of the plane grinding mechanism, and a feed quantity of the grinder unit relative to the workpiece; and the operation interface of the operation device indicates a start command of a smart switching path button, that is switched by the user, to execute a working procedure of the optimum lapping path, and indicates the parameters of the load and the cutting force between the grinder unit and the workpiece during the grinding process.

8. The grinding machine of claim 1, wherein:

the workbench of the plane grinding mechanism carries a plurality of workpieces;

the grinding machine further comprises an image sensing unit mounted on the plane grinding mechanism and electrically coupled to the controller of the electrically controlled device; and the image sensing unit of the smart working control system photographs during the grinding process of the grinder unit and the workpieces, and gets a parameter information which is transmitted to the controller which performs an image operation processing and transmission, while the smart driver receives the commands transmitted by the controller and the smart coder, so as to produce the optimum lapping path.

9. The grinding machine of claim 1, wherein:

the grinding machine further comprises a mobile device connected with the controller of the electrically controlled device by an external cloud server;

the mobile device includes an operation interface operated by a user to preset the movement of the workbench of the plane grinding mechanism, a rotation speed of the mounting structure of the plane grinding mechanism, and a feed quantity of the grinder unit relative to the workpiece; and the operation interface of the mobile device indicates a start command of a smart switching path button, that is switched by the user, to execute a working procedure of the optimum lapping path, and indicates the parameters of the load and the cutting force produced between the grinder unit and the workpiece during the grinding process.

10. The grinding machine of claim 9, wherein the mobile device includes a smart cell phone, a tablet computer, a personal computer or a PDA, and the operation interface of the mobile device includes an APP application program.

* * * * *